United States Patent [19]

Abel et al.

[11] Patent Number: 4,609,239
[45] Date of Patent: Sep. 2, 1986

[54] ELECTROPNEUMATIC COUPLING ELEMENT FOR PROVIDING A PRESSURE-TIGHT CONNECTION BETWEEN A PRESSURE SUPPLY LINE AND A PRESSURE SUPPLY CONNECTION

[75] Inventors: Joachim Abel, Hanover; Juan Rovira, Garbsen, both of Fed. Rep. of Germany

[73] Assignee: WABCO Westinghouse Fahrzeugbremsen GmbH, Hanover, Fed. Rep. of Germany

[21] Appl. No.: 706,556

[22] Filed: Feb. 28, 1985

[30] Foreign Application Priority Data

Mar. 6, 1984 [DE] Fed. Rep. of Germany ....... 3408135

[51] Int. Cl.[4] .............................................. H01R 4/64
[52] U.S. Cl. .................................... 339/15; 339/16 R; 339/94 A; 339/59 M
[58] Field of Search ................... 339/59 R, 59 M, 125, 339/126, 94, 16 R, 117 R, 117 P; 220/3, 3.2, 3.8

[56] References Cited

U.S. PATENT DOCUMENTS

| | | | |
|---|---|---|---|
| 3,321,733 | 5/1967 | Thomas | 339/94 R |
| 3,387,606 | 6/1968 | Crafts et al. | 339/16 R |
| 3,555,487 | 1/1971 | Jones | 339/117 R |
| 3,624,585 | 11/1971 | Kokalas | 339/16 R |
| 3,713,459 | 1/1973 | McIver et al. | 220/3 |
| 3,747,048 | 7/1973 | Johnson et al. | 339/94 R |
| 3,775,251 | 11/1973 | Schabert | 220/3 |
| 3,953,099 | 4/1976 | Wilson | 339/117 R |
| 4,445,744 | 5/1984 | Sedig et al. | 339/94 M |

*Primary Examiner*—Gil Weidenfeld
*Assistant Examiner*—David L. Pirlot
*Attorney, Agent, or Firm*—J. B. Sotak

[57] ABSTRACT

The invention relates to an electropneumatic coupling arrangement for providing a pressure-tight connection between a pressure supply line and a pressure chamber of a hydropneumatic component. The coupler includes a plastic plug-in body member having a pressure conduit and a plurality of electrical contacts for interconnecting an electrical sensing element located in the housing of the hydropneumatic component to apparatus located outside the hydropneumatic component.

9 Claims, 2 Drawing Figures

ELECTROPNEUMATIC COUPLING ELEMENT FOR PROVIDING A PRESSURE-TIGHT CONNECTION BETWEEN A PRESSURE SUPPLY LINE AND A PRESSURE SUPPLY CONNECTION

FIELD OF THE INVENTION

The invention relates to an electropneumatic coupler for establishing a pressure-tight connection between a pressure supply line and a pressure supply connection and, more particularly, to a leak-tight coupling element for interconnecting a pneumatic supply line to a hydropneumatic device as well as for joining the terminal ends of a plurality of electrical conductors for inter-creating a circuit path to an electric instrument located in the hydropneumatic device.

BACKGROUND OF THE INVENTION

It is becoming increasingly important to provide certain equipment with a pressure supply connection and also to provide other apparatus with an electrical connector as well as with a pressure supply connection in order to be able to monitor and control the operating processes or pressure changes which occur in the equipment or apparatus. For example, a pressure supply connection and an electrical connector coupler are required in a suspension system for motor vehicles having a level adjustment and/or height control apparatus. The apparatus is used to determine the actual distance between the vehicle axle and the vehicle frame and is electrically or electronically operated by apparatus which is internally located in the pressure chamber of the suspension elements or the dampening springs.

Such an arrangement requires a pressure-tight lead-in coupler for accommodating the electrical contacts and pressure lines which extend from the pressure chamber to the atmosphere. However, the design of such a coupler not only is difficult but also is expensive due to the limited amount of space that is available.

OBJECTS AND SUMMARY OF THE INVENTION

Accordingly, it is an object of the invention to provide a unique coupling arrangement which makes it possible to create, by simple means, an electropneumatic connection from a pressure holding chamber or from a part located in the chamber to apparatus located outside of the chamber.

Another object of this invention is to provide a new and improved electropneumatic coupler for connecting a pressure supply and electrical power to an air spring dampening device for a vehicle suspension system.

A further object of this invention is to provide a coupling arrangement for providing a pressure-tight connection comprising, a hydropneumatic container having an access hole leading to a pressure chamber, a pressure supply line connectable to the pressure chamber by a supply conduit, an annular body portion fitted into the access hole, and at least one electrical contact carried by the annular body portion for connecting an electrical cable to an electrical component located in the pressure chamber. The presently-described coupling specifically offers the advantage of being able to combine several connections for different purposes into a single component, so that there need only be one hole to hold this component in the wall or in the cover of the apparatus working in a pressure chamber. The space required by the apparatus described by the invention is very small. The installation is simplified, especially if, according to an advantageous embodiment, the coupling is designed as a plug.

BRIEF DESCRIPTION OF THE DRAWINGS

The above objects and other attendant features and advantages of the present invention will become more readily apparent from the following detailed description when considered in conjunction with the ensuing drawings, wherein.

DETAILED DESCRIPTION OF THE INVENTION

Figure 1:
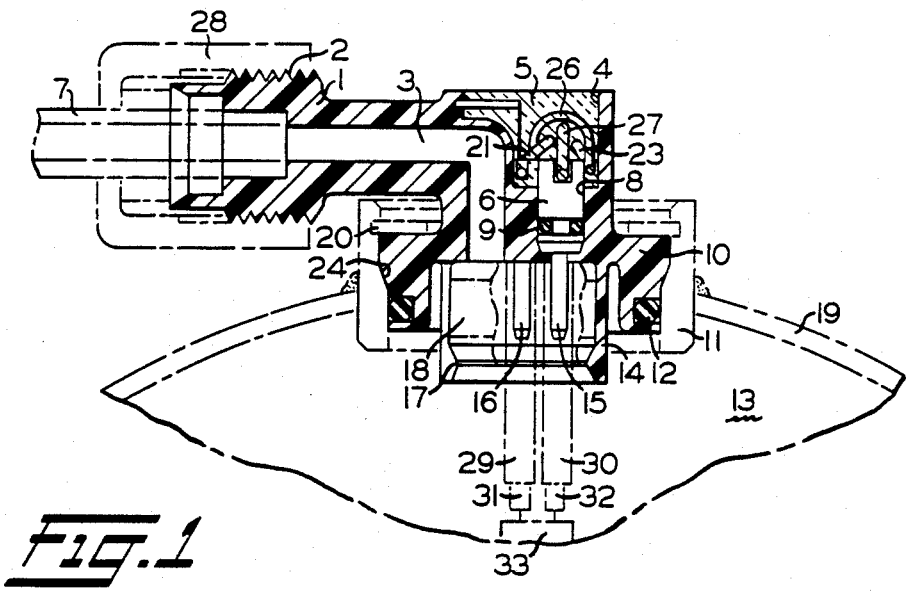
FIG. 1 is a sectional view taken along line I—I of FIG. 2 showing a coupler designed as a combined electropneumatic lead-in connection to unite and to connect the pressure chamber of a suspension spring damper apparatus with a pressure supply source and to link an electrical component located in the pressure chamber with an electrical apparatus located outside the pressure chamber.

Referring now to the drawings and in particular to FIG. 1, there is shown, partly in section, a portion of a hydropneumatic spring suspension system having a casing or jacket 19 having an access hole over which an annular connection or ring-shaped collar 11 is secured for accommodating an electropneumatic lead-in connector or coupler. The electropneumatic lead-in connector consists of a coupling 1, 10, preferably made of plastic, in which there is a pressure supply duct or conduit 3 and several graduated holes 8 to hold electrical plug contacts 6, 15, 16. The coupler includes an annular body member or portion 10 having an outside diameter which corresponds approximately to the inside diameter of the pressure connection collar 11 which is secured, such as by being welded to the casing 19. The lower peripheral surface of annular portion 10 is provided with a circumferential groove for accommodating an O or sealing ring 12 which is in contact with and which forms a seal with the inside wall of the connection collar 11. The annular portion 10 includes a depending annular or ring-shaped projection 14. It will be seen that the ring-shaped portion projects into the vicinity of the pressure chamber 13 of the hydropneumatic spring casing or container 19. The annular projection 14 includes an inwardly-extending circular bead 17 which will be described hereinafter. The open end of conduit 3 is in communication with the annular projection 14. The feed end of the duct 3 is designed as the pressure supply terminal male fitting 2, which is coupled by threaded female pressure fitting 28, to portion 1 of the coupling 1, 10 which is oriented at approximately right angles to the portion 10. The coupler is held in place by means of a retaining or snap ring 20, which is snapped into an annular groove provided in the inside wall of the collar 11. The underside of ring 20 is in contact with the top surface of the cylindrical portion 10 of coupling 1, 10 and is urged against a graduated ledge 24 on the inner wall of the collar 11.

The upper conductive pin portions of the electrical plug contacts 6, 15, 16 are located in the reception hole or bore 8. As shown, the upper ends of the pin contacts are larger in diameter than the lower portions which extend into the open space 18. An O or sealing ring 9 is filled in a circumferential groove formed in the upper part of each plug contact 6, 15, 16. The sealing ring 9 prevents inadvertent escape of air pressure from the pressure chamber 13 via the holes 8. An upper recess 4 is located above the contact holes 8. The recess 4 is filled with an insulative or nonconductive material, such as, a curable plastic resin which covers and protects the electrical plug contacts against moisture, dust, dirt, and other foreign material.

Figure 2:
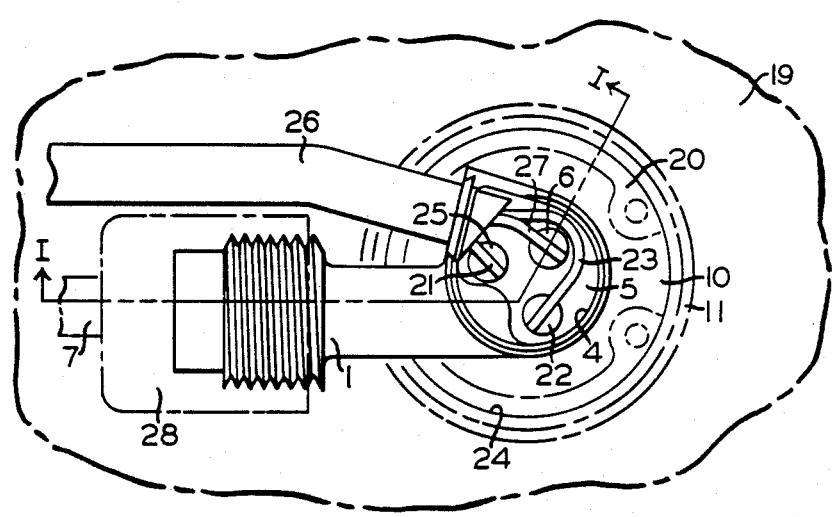
FIG. 2 is a partial top plan view of the coupling device of FIG. 1.

As shown in FIG. 2, the coupling described above is shown with further details of the hydropneumatic suspension spring container 19. For the sake of consistency, the various components are identified with the same reference numbers as those used in FIG. 1.

It will be seen that a circular access hole is formed in the wall 19 of the casing of the hydropneumatic suspension spring housing. The collar portion 11 of the coupling 1, 10 is secured to the housing 19 and the connector 10 and it is held to the collar 11 by means of a snap ring 20. As noted above, the portion 1 of the coupling 1, 10 is oriented approximately at a right angle to the portion 10. The open end of the coupler is covered by the sealing material 5 which is used on one hand to protect the plug contacts 22, 6, 25, and on the other hand to hold the ends of the electrical wires 21, 23, 27 which are electrically connected to the plug contacts 6, 22, 25, respectively. The electrical conductors 21, 23, 27 are further protected by an outer insulative sleeve or sheath forming an electrical cable 26 which is connected to the upper central portion 10 of the coupling 1, 10. The connection of a pressure supply line 7 is also made to the upper central portion 10 of the coupling 1, 10.

The utilization of the coupling arrangement described by the invention can be readily achieved, for example, by first connecting the conductors 21, 23, 27 coming from the electrical and/or electronic apparatus with the contacts 6, 22, 25 which are arranged in a sealed manner 5 in the hole 4 of the coupling 1, 10. The entire coupler 1, 10 is then plugged into the circular hole formed in the hydropneumatic spring body. Thus, annular bead 17 of the annular projection 14 surrounding the contacts 6, 22, 25 snaps into a corresponding recess of a corresponding part (not shown) which is connected with the internal electrical or electronic parts which are mounted in the pressure chamber 13 of the hydropneumatic spring body 19. The plug pins of contacts 6, 22, 25 are pushed into corresponding sockets 29, 30 connected to suitable component lead-in wires during the insertion of the coupler. That is, the sockets are connected by conductors 31, 32 to a pressure sensing component 33. The admission of supply pressure to the pressure chamber 13 or the discharge of the storage pressure from the pressure chamber 13 is achieved by means of the connection pipe 1, the duct 3, and the chamber 18 of the coupling 1, 10. The plug contacts can be securely held in the body of the coupling element 1, 10 by means of adhesives, molding, screw threads, etc. It is also possible to include a mounting plate having any number of electrical contacts for being positioned in the coupling element.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed. It will be understood that variations, modifications, equivalents and substitutions for components of the above specifically-described embodiment of the invention may be made by those skilled in the art without departing from the spirit and scope of the invention as set forth in the appended claims.

Having thus described our invention, what we claim as new and desire to secure by Letters Patent, is:

1. A coupling arrangement for providing a pressure-tight connection comprising, a hydropneumatic container having an access hole leading to a pressure chamber, an annular collar disposed in said access hole and secured to said container, an annular body portion fitted into and urged against a graduated ledge formed in said annular collar, a pressure supply line connectable to said pressure chamber by a right angle supply conduit formed in said annular body portion, and at least one electrical contact sealed and carried by said annular body portion for preventing leakage of pressure from said pressure chamber and for connecting an electrical cable to an electrical component located in said pressure chamber.

2. The coupling, according to claim 1, wherein said electrical component is located inside said pressure chamber which is pressurized by the pressure supplied by said pressure supply line.

3. The coupling, according to claim 1, wherein a snap ring permits detachable connection between said annular body portion and said annular collar.

4. The coupling, according to claim 1, wherein said electrical contact is located in a recessed hole formed in said annular body portion and a sealing element is located between the wall of the recessed hole and electrical contact.

5. The coupling, according to claim 1, wherein said electrical contact is protected by a plastic cover.

6. The coupling, according to claim 1, wherein a plurality of electrical contacts are connected to said electrical component which is located in said pressure chamber.

7. The coupling, according to claim 1, wherein said annular body portion is plastic.

8. The coupling, according to claim 1, wherein an O-ring is carried by said annular body portion to provide a pressure seal.

9. The coupling, according to claim 1, wherein an internally beaded annular projection extends into said pressure chamber.

* * * * *